(12) United States Patent
Drinkwater

(10) Patent No.: US 8,450,970 B1
(45) Date of Patent: May 28, 2013

(54) SMALL FOOTPRINT PORTABLE BATTERY CHARGING STATION

(75) Inventor: Jared I. Drinkwater, King County, WA (US)

(73) Assignee: Micro Power Electronics, Inc., Beaverton, OR (US)

( * ) Notice: Subject to any disclaimer, the term of this patent is extended or adjusted under 35 U.S.C. 154(b) by 0 days.

(21) Appl. No.: 12/009,053

(22) Filed: Jan. 16, 2008

Related U.S. Application Data

(60) Provisional application No. 60/930,234, filed on May 14, 2007.

(51) Int. Cl.
  *H02J 7/00* (2006.01)
  *H02J 7/02* (2006.01)
(52) U.S. Cl.
  USPC ........... 320/112; 320/107; 320/108; 320/110; 320/111; 320/113
(58) Field of Classification Search
  CPC ........................................................ Y02E 60/12
  USPC ................ 320/107, 113, 112; D13/107, 118, D13/119, 120
  See application file for complete search history.

(56) References Cited

U.S. PATENT DOCUMENTS

| | | | | |
|---|---|---|---|---|
| D227,680 S | * | 7/1973 | Fischer | D13/107 |
| 5,317,691 A | * | 5/1994 | Traeger | 709/250 |
| 6,184,655 B1 | * | 2/2001 | Malackowski | 320/116 |
| 7,332,889 B2 | * | 2/2008 | Glasgow et al. | 320/107 |
| 2007/0139004 A1 | * | 6/2007 | Satsuma | 320/114 |

* cited by examiner

*Primary Examiner* — Edward Tso
*Assistant Examiner* — Ahmed Omar
(74) *Attorney, Agent, or Firm* — Michael F. Scalise

(57) ABSTRACT

A small footprint portable battery charging station having a vertically mounted circuit board, containing the charging circuit components, enclosed within a housing. The charging station is arrayed with bays back to back within which the batteries under charge may be mounted. The battery charging station further containing intake vents close to the base of the station and exhaust vents close to the top of the station. These vents encourage the natural convective flow of air around the charging circuit components.

22 Claims, 5 Drawing Sheets

FIG. 5A
FIG. 5B
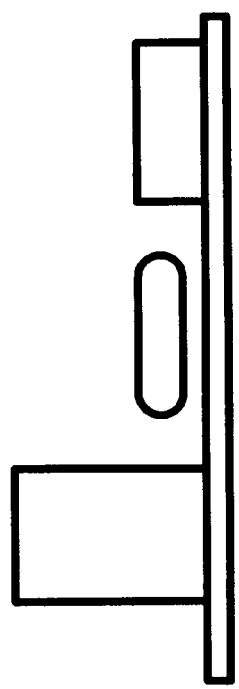
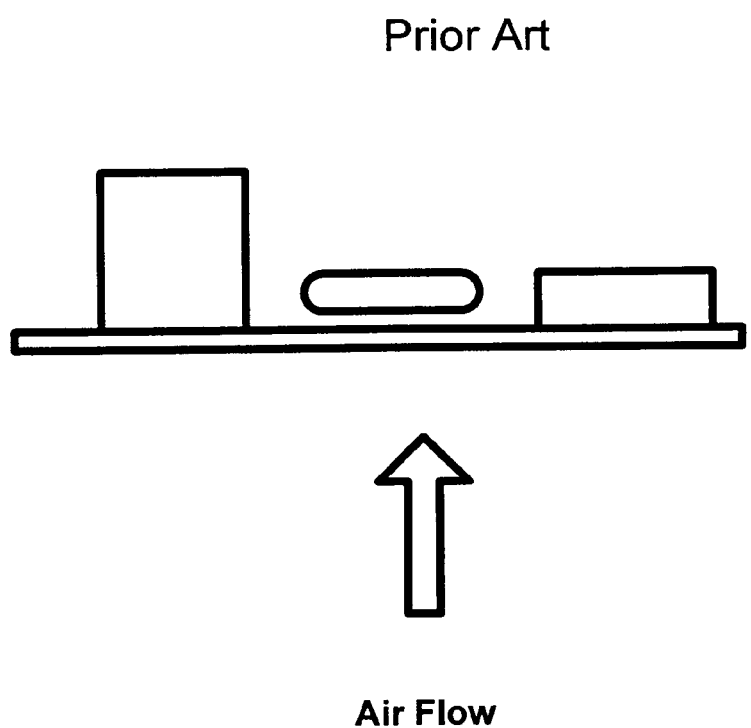
Prior Art
Air Flow
Air Flow

SMALL FOOTPRINT PORTABLE BATTERY CHARGING STATION

CROSS-REFERENCE TO RELATED APPLICATIONS

This application is entitled to the benefit of Provisional Patent Application Ser. No. 60/930,234 filed May 14, 2007

BACKGROUND

1. Field

The present invention relates to the thermal management of a battery charging system. Controlling the heat flow from the circuit that converts analog power to a digital charging pulse to the battery under charge is necessary to ensure a fast and complete charge without any degradation of that battery. Lithium ion batteries are particularly susceptible to the influences of temperature while under charge and are typically required to have their charging suspended when the battery temperature reaches 45° Celsius.

2. Description of Related Art

There have been previous attempts to control the heat transferred from the charging circuit to the batteries under charge. Some designs have ignored the problem of the heat from charging circuit components reaching the battery(s) under charge and have modified their battery charging parameters to keep the battery temperatures within the recommended limits. In the past this was done by adjusting the voltage and charging cycles when the temperature measurement means of the battery under charge had reached certain predetermined limits. This, however, increased the time required to charge the battery, added cost, complexity and another potential failure point of the charging unit. Other approaches included adding cooling fins to the unit to transfer the heat generated by the charging circuit. However this adds weight and size to the battery charger. The amount of heat carried away is largely dependent on the ambient temperature and the amount of air flow circulating around the fin. Still another method has included increasing the physical distance of the battery under charge from the charging circuit board as seen in U.S. Pat. No. 6,710,577 issued to King Mo Shum for Battery Charger and patent application Ser. No. 11/649,057 by David Nierescher for Thermal Management of Battery Charging Systems. Both of these methods increase the size of the footprint required by the charger.

OBJECTS AND ADVANTAGES

Accordingly several objects and advantages of the present invention are: reduced charger footprint, easy portability and reduced charging time. Another advantage is less cost, weight and size because there is an absence of high conductivity (usually metal) cooling fins that need to be fabricated and installed. The cooler the battery is while recharging means higher recharging power may be applied to the battery. This reduces charging time, which, in turn, means the battery may be returned to service sooner and the need for spare batteries is reduced. The present invention reduces the amount of heat that is transferred from the charging circuit components to the battery(s) under charge. Although this design approach is of particular benefit to recharging Lithium-ion batteries, it is also beneficial to all types of rechargeable batteries. A small footprint charger reduces the amount of bench or floor space required to set up the station. In the preferred embodiment power is supplied to the charging station via a built-in line cord that plugs into wall power.

SUMMARY

In accordance with the present invention a battery charger is presented that is configured to reduce the amount of heat, generated by components of a charging circuit, that reaches the batteries under charge. The charging circuit housing containing the components of said charging circuit is vertically oriented to allow the heat generated by the charging circuit heat to convectively rise through vents at the top of the charger. This heat would normally flow around the batteries under charge when these batteries are mounted on top of the charging circuit as is seen in many charging configurations. To further increase the heat flow up and out of the battery charger, the preferred embodiment of the present invention adds one or more cooling fans at the bottom of the housing. This further cools the unit by bring in a higher volume of ambient temperature air from the bottom of the charging unit than convection alone would bring in.

BRIEF DESCRIPTION OF THE DRAWINGS

The invention is further described in connection with the accompanying drawings, in which:

FIG. 5A shows the air flow around the vertically mounted printed circuit board.

FIG. 5B shows the air flow blocked by the usual printed circuit board mounted horizontally.

DETAILED DESCRIPTION OF THE PREFERRED EMBODIMENT

What is described herein is a an apparatus for utilizing a small footprint, vertically oriented battery charging housing that allows dissipation of charging circuit heat to the atmosphere without this electronically generated heat passing through or around the batteries under charge. It will be appreciated by those knowledgeable in the art that batteries, specifically Lithium Ion batteries, but in general all rechargeable batteries, can be charged faster and more safely if they are isolated from other heat sources.

The present invention incorporates a unique architecture that facilitates the removal of heat generated by the charging circuit components without allowing that heat to be absorbed by the batteries under charge.

Although the figures represent one embodiment of the present invention, it is readily appreciated that one skilled in the art given this disclosure could produce multiple other embodiments using this same invention. All of the illustrations show a battery charger with four battery bays on each side of the charger. This is for illustration purposes only. The actual chargers embodying the inventive characteristics of this disclosure may have any number of bays in any type of configuration.

Figure 1:
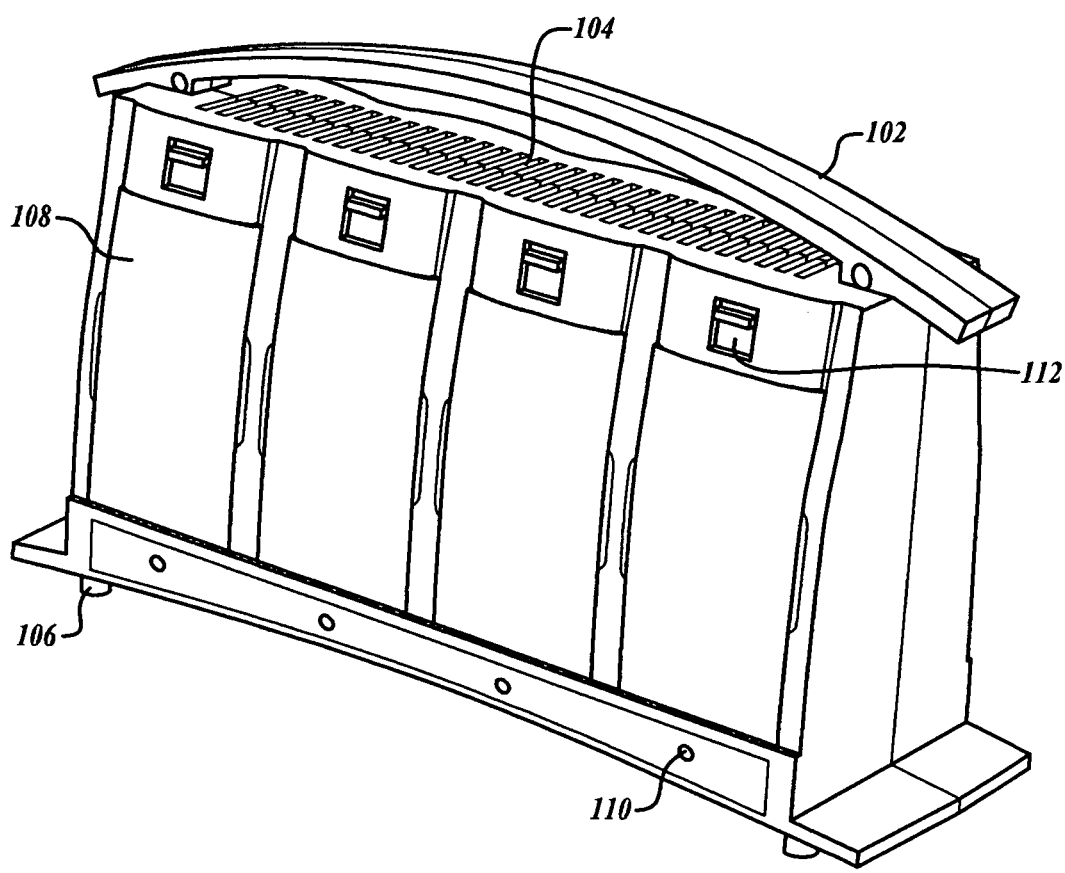
FIG. 1 illustrates the battery charger with four charging stations on each side

As seen in FIG. 1 the battery charger, shown with the batteries under charge, consists of a handle 102, upper cooling vents 104, housing feet 106, batteries under charge 108, activity light 110, and latch release 112. The handle 102 also acts as a shield from moisture or spills that may otherwise enter the battery charging enclosure via the upper vents 104. The handle also serves as a convenient location around which may be wrapped the charger power cord (not shown). The housing feet 106 lift the housing off the surface upon which the charger is resting thereby giving a space for the lower vents, 402 in FIG. 4, to draw in ambient air. The activity light 110 may have multiple purposes. One purpose may be to show that the battery has been adequately mounted within the battery housing and is undergoing a successful charge. The activity light may also be used to signal, by using a different color or by flashing, that the battery under charge has been successfully charged and may then be removed. Other colors and other signaling means may be added to indicate other conditions.

Figure 2:
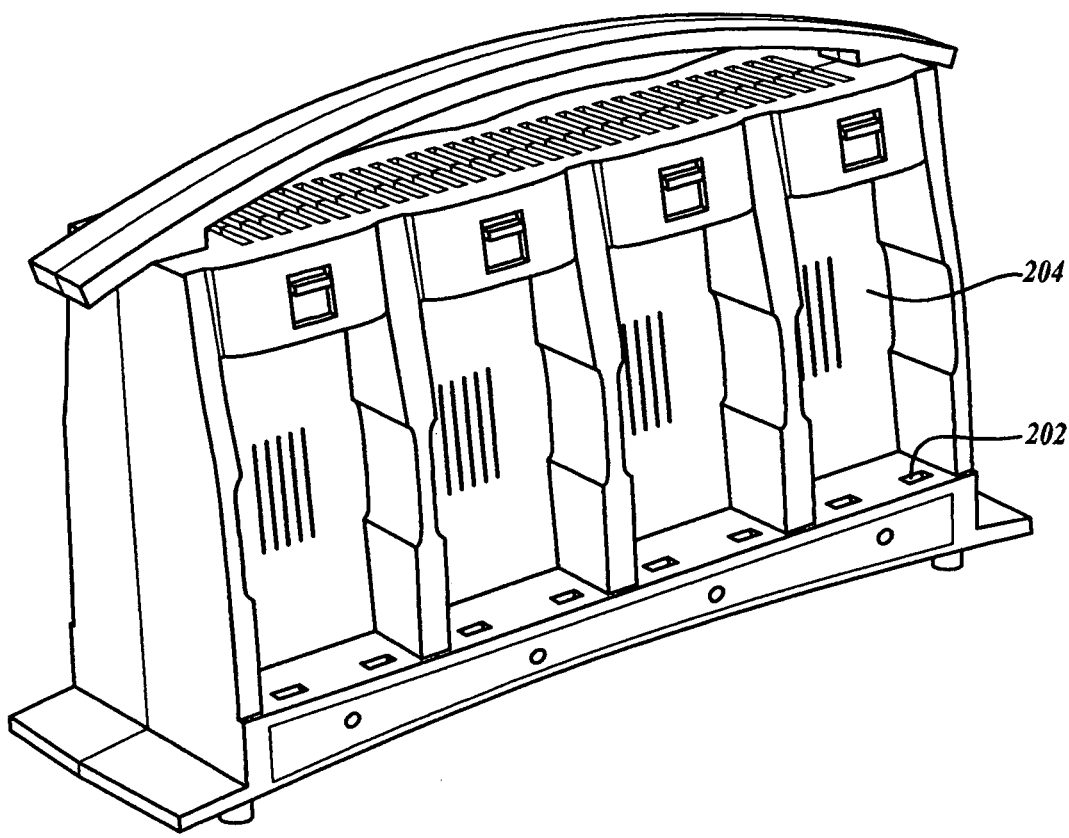
FIG. 2 shows the battery charger bays with the batteries removed.

As seen in FIG. 2, showing the housing with the batteries removed, the individual charging bays 204 comprises a cavity within which to mount the battery and further comprises the charging contacts with which to make electrical contact with the battery under charge. The two recesses 202 match the corresponding two tabs on the bottom of the battery under charge to positively position the battery into the charging bay. There are many different configurations the charging contacts of the charger may make with the battery under charge depending upon the battery configuration and the type of signals, both incoming and outgoing, that the charger may want to use to exchange information with the battery under charge.

Figure 3:
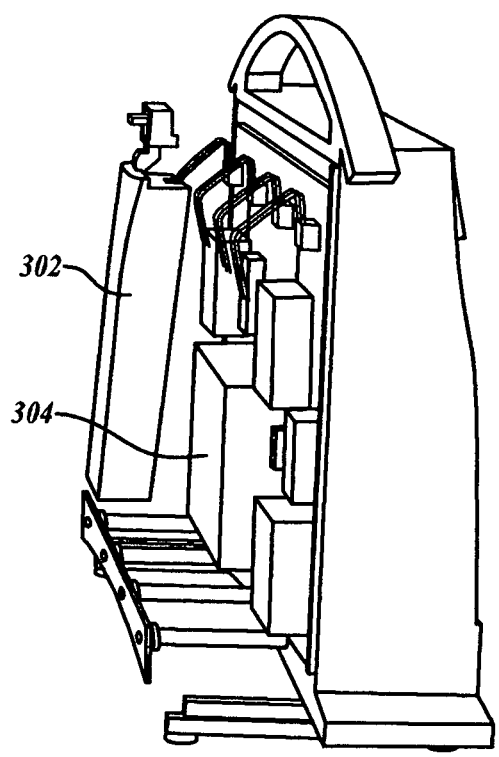
FIG. 3 illustrates the battery charger with the battery bay shroud removed.

FIG. 3 shows the housing with the battery bay shroud removed. The charging circuit components 304 make up the center core of the charger with the battery under charge 302 mounted vertically and supported by the battery bay shroud (removed in the drawing for sake of clarity).

Figure 4:
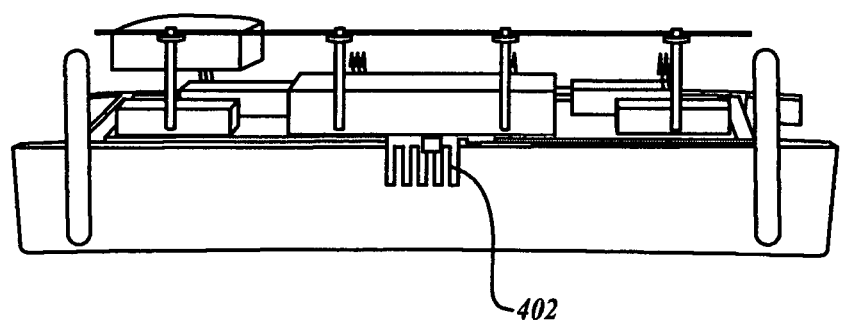
FIG. 4 shows a bottom perspective of the battery charger with the battery bay shroud removed.

FIG. 4 shows the bottom view perspective of FIG. 3 with the component circuit board air intake vent 402 shown. In the preferred embodiment the flow of ambient air into the central plenum where the board is located may be increased by means of an intake fan.

FIG. 5 shows the difference between the standard orientation of the charging component circuit board 5B (horizontal to convective air flow) that blocks the cooling air from reaching the components and the present invention's orientation 5A that allows the free passage of convective air.

Therefore, although the invention has been described as setting forth specific embodiments thereof, the invention is not limited thereto. Changes in the details may be made within the spirit and the scope of the invention, said spirit and scope to be construed broadly and not to be limited except by the character of the claims appended hereto.

I claim:

1. A battery charger, comprising:
   a) a housing comprising a vertical wall extending from a top surface to an aligned and parallel bottom surface, wherein the top and bottom surfaces are parallel to a surface upon which the charger is configured to rest;
   b) a charging circuit board supported by the vertical wall, the charging circuit board being substantially enclosed in the housing;
   c) at least two side-by-side battery bays incorporated in the housing, but isolated from the charging circuit board by the vertical wall;
   d) at least one first vent incorporated within the top surface of the housing;
   e) at least one second vent incorporated within the bottom surface of the housing; and
   f) an integrated carrying handle connected to and situated above the housing, the handle covering a majority of the at least one first vent to thereby substantially act as a shield from moisture or spills that may otherwise enter the housing through the first vent.

2. The battery charger of claim 1 further including a fan mounted within the housing and orientated above the at least one second vent.

3. The battery charger of claim 1 further including surface stand-offs to aid air flow into the at least one second vent.

4. The battery charger of claim 1 wherein there are four side-by-side battery bays.

5. The battery charger of claim 1 further including an activity light that is configured to indicate when a battery is properly mounted in the housing.

6. The battery charger of claim 1 wherein the battery bays are configured such that a battery is aligned generally vertical to the top and bottom surfaces when properly mounted in the housing.

7. The battery charger of claim 1 wherein the bottom surface of the housing includes two recesses that are configured to receive corresponding tabs on a bottom of a battery mounted in the housing.

8. A battery charger, comprising:
   a) a housing comprising a vertical wall extending from a top wall to a parallel bottom wall;
   b) a charging circuit board supported by the vertical wall, the charging circuit board being substantially enclosed in the housing;
   c) at least two side-by-side battery bays incorporated in the housing, but isolated from the charging circuit board by the vertical wall;
   d) at least one first vent incorporated within the top wall of the housing;
   e) at least one second vent incorporated within the bottom wall of the housing; and
   f) an integrated carrying handle connected to and situated above the housing, the handle covering a majority of the at least one first vent to thereby substantially act as a shield from moisture or spills that may otherwise enter the housing through the first vent.

9. The battery charger of claim 8 further including a fan mounted within the housing and orientated above the at least one second vent.

10. The battery charger of claim 8 further including surface stand-offs to aid air flow into the at least one second vent.

11. The battery charger of claim 8 wherein there are four side-by-side battery bays.

12. The battery charger of claim 8 further including an activity light that is configured to indicate when a battery is properly mounted in the housing.

13. The battery charger of claim 8 wherein the battery bays are configured such that a battery is aligned generally vertical to the top and bottom walls when properly mounted in the housing.

14. The battery charger of claim 8 wherein the bottom wall of the housing includes two recesses that are configured to receive corresponding tabs on a bottom of a battery mounted in the housing.

15. A battery charger, comprising:
   a) a housing comprising a vertical wall extending from a top wall to a bottom wall;
   b) a charging circuit board supported by the vertical wall, the charging circuit board being substantially enclosed in the housing;

c) at least two side-by-side battery bays incorporated in the housing, but isolated from the charging circuit board by the vertical wall;

d) at least one first vent incorporated within the top wall of the housing;

e) at least one second vent incorporated within the bottom wall of the housing; and f) an integrated carrying handle connected to and situated above the housing, the handle covering a majority of the at least one first vent to thereby substantially act as a shield from moisture or spills that may otherwise enter the housing through the first vent.

16. The battery charger of claim 15 wherein the top wall is generally parallel to the bottom wall.

17. The battery charger of claim 15 further including a fan mounted within the housing and orientated above the at least one second vent.

18. The battery charger of claim 15 further including surface stand-offs to aid air flow into the at least one second vent.

19. The battery charger of claim 15 wherein there are four side-by-side battery bays.

20. The battery charger of claim 15 further including an activity light that is configured to indicate when a battery is properly mounted in the housing.

21. The battery charger of claim 15 wherein the battery bays are configured such that a battery is aligned generally vertical to at least the bottom wall when properly mounted in the housing.

22. The battery charger of claim 15 wherein the bottom wall of the housing includes two recesses that are configured to receive corresponding tabs on a bottom of a battery mounted in the housing.

* * * * *